US009874010B2

(12) United States Patent
Gosling

(10) Patent No.: US 9,874,010 B2
(45) Date of Patent: Jan. 23, 2018

(54) PANEL AND WALL MODULE CONNECTION APPARATUS, METHODS, AND SYSTEMS

(71) Applicant: DIRTT ENVIRONMENTAL SOLUTIONS, INC., Salt Lake City, UT (US)

(72) Inventor: Geoff Gosling, Calgary (CA)

(73) Assignee: DIRTT Environmental Solutions, LTD, Calgary (CA)

( * ) Notice: Subject to any disclaimer, the term of this patent is extended or adjusted under 35 U.S.C. 154(b) by 0 days.

(21) Appl. No.: 14/406,518

(22) PCT Filed: Jun. 3, 2014

(86) PCT No.: PCT/US2014/040724
§ 371 (c)(1),
(2) Date: Dec. 8, 2014

(87) PCT Pub. No.: WO2014/200765
PCT Pub. Date: Dec. 18, 2014

(65) Prior Publication Data
US 2016/0265218 A1    Sep. 15, 2016

Related U.S. Application Data

(60) Provisional application No. 61/835,403, filed on Jun. 14, 2013.

(51) Int. Cl.
*E04B 2/72*     (2006.01)
*E04B 1/61*     (2006.01)
(Continued)

(52) U.S. Cl.
CPC ............ *E04B 2/721* (2013.01); *E04B 1/6116* (2013.01); *E04B 2/7401* (2013.01);
(Continued)

(58) Field of Classification Search
CPC ........ F16B 5/0685; F16B 12/02; F16B 12/26; F16B 21/073; F16B 5/0614; F16B 3/00;
(Continued)

(56) References Cited

U.S. PATENT DOCUMENTS 1,365,065 A * 1/1921 Sherwood ................. F16L 3/06
16/252
3,139,958 A * 7/1964 De Witt ................ E04B 1/3445
160/213
(Continued)

FOREIGN PATENT DOCUMENTS

DE        9109828        2/1992
FR         932735        7/1963
(Continued)

OTHER PUBLICATIONS

International Search Report and Opinion on PCT/US2014/040724, dated Oct. 15, 2014.

*Primary Examiner* — Brent W Herring
(74) *Attorney, Agent, or Firm* — Workman Nydegger

(57) ABSTRACT

Implementations of the present invention relate to systems, methods, and apparatus for connecting panels, wall modules, modular walls, partitions, and combinations thereof. Particularly, one or more implementations described herein may facilitate making quick and easy connections between panels, wall modules, modular walls, partitions, and combinations thereof. Furthermore, at least one implementation may allow an installer to interconnect panels, wall modules, modular walls, partitions, while providing a pleasing aesthetic in a final structure.

28 Claims, 12 Drawing Sheets

(51) Int. Cl.
*E04B 2/74* (2006.01)
*E04B 2/82* (2006.01)
*A47B 47/00* (2006.01)
*F16B 3/00* (2006.01)
*F16B 5/06* (2006.01)
*F16B 12/02* (2006.01)
*F16B 12/26* (2006.01)
*F16B 21/07* (2006.01)

(52) U.S. Cl.
CPC ............ *E04B 2/7405* (2013.01); *E04B 2/828* (2013.01); *A47B 47/0041* (2013.01); *E04B 2001/6195* (2013.01); *E04B 2002/7466* (2013.01); *F16B 3/00* (2013.01); *F16B 5/0614* (2013.01); *F16B 12/02* (2013.01); *F16B 12/26* (2013.01); *F16B 21/073* (2013.01)

(58) Field of Classification Search
CPC ...... E04B 2/721; E04B 2/7401; E04B 2/7405; E04B 2/828; E04B 1/6116; E04B 2002/7466; E04B 2001/6195; A47B 47/0041
USPC ............................ 403/397, 65; 16/252; 52/71
See application file for complete search history.

(56) References Cited

U.S. PATENT DOCUMENTS

| | | | | |
|---|---|---|---|---|
| 3,158,961 A * | 12/1964 | Hawkins | ................... | E04D 3/08 52/200 |
| 3,323,819 A * | 6/1967 | Barker | ................... | B62D 33/04 160/392 |
| 4,021,973 A * | 5/1977 | Hegg | ................... | A47G 5/00 160/351 |
| 4,279,455 A * | 7/1981 | Santo | ................... | A47B 88/00 312/140 |
| 4,361,931 A * | 12/1982 | Schnelle | ................... | E05D 5/08 16/252 |
| 4,438,605 A * | 3/1984 | DeLucia | ................... | E04B 1/76 16/225 |
| 4,477,201 A * | 10/1984 | Yoshiyuji | ................... | F16B 12/02 403/205 |
| 4,608,794 A * | 9/1986 | Delise | ................... | F16B 12/46 403/231 |
| 4,645,374 A * | 2/1987 | Erickson | ................... | F16B 5/0052 403/402 |
| 4,840,440 A * | 6/1989 | Dieter | ................... | F16B 12/46 217/65 |
| 4,913,576 A * | 4/1990 | Grant, Jr. | ................... | A47G 27/045 16/16 |
| 4,936,530 A * | 6/1990 | Wollar | ................... | F16B 2/12 248/68.1 |
| 4,968,171 A * | 11/1990 | Shell | ................... | E04B 2/7427 16/224 |
| 5,329,667 A * | 7/1994 | Erskine | ................... | E05D 1/04 16/269 |
| 5,398,468 A | 3/1995 | Erickson | | |
| 5,502,930 A * | 4/1996 | Burkette | ................... | E04B 2/7429 16/225 |
| 5,603,142 A * | 2/1997 | Dubach | ................... | E05D 7/0415 16/235 |
| 5,642,557 A | 7/1997 | Clews | | |
| 5,644,878 A * | 7/1997 | Wehrmann | ................... | E04B 2/7457 52/235 |
| 5,857,510 A * | 1/1999 | Krupke | ................... | E05D 15/165 160/187 |
| 5,901,526 A * | 5/1999 | Vidmar | ................... | E04H 12/2215 256/19 |
| 5,915,446 A * | 6/1999 | De Zen | ................... | E05D 15/242 16/269 |
| 6,170,121 B1 * | 1/2001 | Domenig | ................... | E05D 5/065 16/236 |
| 6,173,547 B1 * | 1/2001 | Lipson | ................... | E04B 1/3211 403/403 |
| 6,186,357 B1 * | 2/2001 | Kyle | ................... | B65D 43/164 16/355 |
| 6,261,026 B1 | 7/2001 | Conley | | |
| 6,267,525 B1 * | 7/2001 | Wu | ................... | A47G 5/00 160/135 |
| 6,315,495 B1 * | 11/2001 | Starheim | ................... | E02D 31/002 220/4.33 |
| 6,721,993 B1 * | 4/2004 | Jensen | ................... | E05D 5/023 16/252 |
| 6,772,905 B2 * | 8/2004 | Cheng | ................... | B65D 43/166 16/355 |
| 6,810,563 B1 * | 11/2004 | Domenig | ................... | E05D 5/065 16/236 |
| 6,843,025 B2 * | 1/2005 | Paz | ................... | E04B 1/34315 312/111 |
| 7,014,391 B2 * | 3/2006 | Starheim | ................... | E02D 27/01 405/129.55 |
| 7,322,072 B2 * | 1/2008 | Lin | ................... | H05K 5/0221 16/252 |
| 7,458,190 B2 | 12/2008 | Isaac | | |
| 7,895,800 B2 * | 3/2011 | Overgaard | ................... | E04F 13/0816 52/235 |
| 8,381,468 B2 * | 2/2013 | Koupal | ................... | E04B 1/6162 52/282.1 |
| D698,628 S * | 2/2014 | Stanley | ................... | D8/367 |
| 2003/0131445 A1 * | 7/2003 | Padiak | ................... | E05D 5/023 16/309 |
| 2004/0096276 A1 * | 5/2004 | Startteim | ................... | E02D 27/01 405/129.8 |
| 2004/0216271 A1 * | 11/2004 | Schott | ................... | E05D 5/0238 16/234 |
| 2009/0272056 A1 * | 11/2009 | Koupal | ................... | E04B 1/6162 52/309.4 |
| 2010/0263309 A1 * | 10/2010 | Overgaard | ................... | E04F 13/142 52/235 |
| 2012/0079682 A1 * | 4/2012 | Cheng | ................... | E05D 11/1064 16/252 |
| 2015/0252602 A1 * | 9/2015 | Nielsen | ................... | E05D 11/06 16/275 |

FOREIGN PATENT DOCUMENTS

| | | |
|---|---|---|
| GB | 487332 | 6/1938 |
| GB | 2267722 | 12/1993 |
| GB | 2326186 | 12/1998 |
| NL | 1017028 | 7/2002 |

* cited by examiner

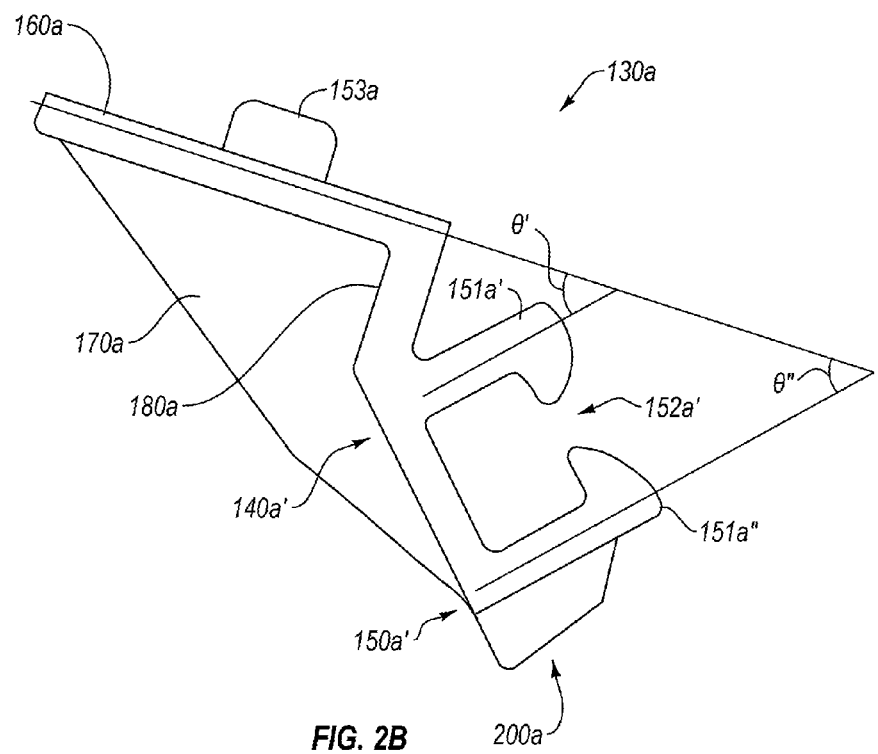
FIG. 2B
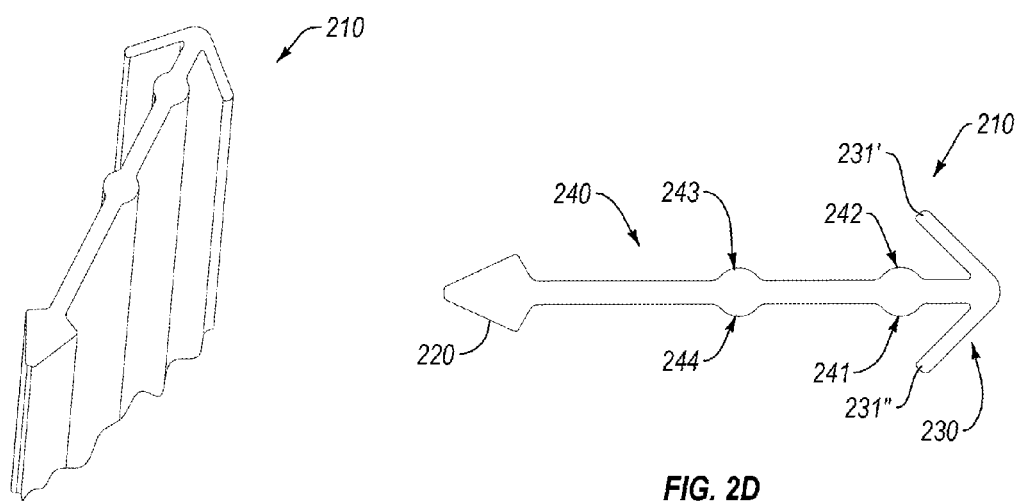
FIG. 2C
FIG. 2D

PANEL AND WALL MODULE CONNECTION APPARATUS, METHODS, AND SYSTEMS

CROSS-REFERENCE TO RELATED APPLICATIONS

This application is a 35 U.S.C. § 371 U.S. National Stage of PCT Application No. PCT/US 14/40724 filed Jun. 3, 2014, entitled PANEL AND WALL MODULE CONNECTION APPARATUS, METHODS, AND SYSTEMS, which is a non-provisional of U.S. Provisional Application No. 61/835,403, filed Jun. 14, 2013, and entitled PANEL AND WALL MODULE CONNECTION APPARATUS, METHODS, AND SYSTEMS. The entire content of each of the aforementioned patent applications is incorporated herein by reference.

BACKGROUND OF THE INVENTION

1. The Field of the Invention

This invention relates to systems, methods, and apparatus for connecting panels, such as panels of wall modules, partitions, and modular walls.

2. Background and Relevant Art

Office space can be relatively expensive due to the basic costs of the location and size of the office space. In addition to these costs, an organization may incur further expense configuring the office space in a desirable layout. An organization might purchase or rent a large open space in a building, and then subdivide or partition the open space into various offices, conference rooms, or cubicles. Rather than having to find new office space and move as an organization's needs change, it is often desirable to reconfigure the existing office space. Many organizations address their configuration and reconfiguration needs by dividing large, open office spaces into individual spaces or work areas using modular walls and partitions.

In particular, at least one advantage of modular walls is that they are relatively easy to configure. In addition, modular walls can be less expensive to set up and can allow for reconfiguration more easily than more permanently constructed office dividers. For example, a set of offices and a conference area can be carved out of a larger space in a relatively short period of time with the use of modular walls. If office space needs change, the organization can readily reconfigure the space.

In general, modular walls and partitions typically include a series of individual wall modules (and/or panels). The individual wall modules are typically free-standing or rigidly attached to one or more support structures. In addition, the wall modules are typically designed to provide a wide variety of potential configurations. In particular, a manufacturer or assembler can usually align and join the various wall modules together in almost any particular design. These designs can include anything from large conference spaces to individual offices.

As such, wall modules, panels, and/or partitions may include various components and hardware that may allow an assembler to connect such wall modules, panels, and partitions together. In some instances, connection components or hardware can be expensive, bulky, difficult to assemble, or unsightly. Accordingly, there are a number of disadvantages in modular walls and partitions that can be addressed.

BRIEF SUMMARY OF THE INVENTION

Implementations of the present invention provide systems, methods, and apparatus for connecting panels, wall modules, modular walls, partitions and combinations thereof. Particularly, one or more implementations described herein may facilitate making quick and easy connections between panels, wall modules, modular walls, partitions and combinations thereof. Furthermore, at least one implementation may allow an installer to interconnect panels, wall modules, modular walls, and/or partitions, while providing a pleasing aesthetic in a final structure.

According to one example implementation, a connector bracket is provided for connecting together adjacent panels or wall modules. The connector bracket may include a mounting plate and one or more receiving portions connected to the mounting plate. Each of the one or more receiving portions may include opposing hook-like protrusions that form one or more openings in the one or more receiving portions. The one or more openings may be sized and configured to receive a coupling connector. Furthermore, the one or more receiving portions may be oriented at a predetermined angle relative to the mounting plate.

In another implementation, connection hardware for connecting adjacent panels or wall modules is provided. The connection hardware may include a coupling connector, a first connector bracket, and a second connector bracket. The first connector bracket may include one or more first receiving portions sized and configured to receive the coupling connector. Similarly, the second connector bracket may include one or more second receiving portions sized and configured to receive the coupling connector. The one or more first and second receiving portions may be sized and configured to align relative to each other in a manner that the coupling connector can connect together the first and second connector brackets.

In yet another example implementation, a modular assembly for subdividing open space in a building into one or more individual spaces is provided. The modular assembly may include a first panel, a second panel, and a coupling connector. The first panel may include one or more first connector brackets. Each of the one or more first connector brackets may include one or more first receiving portions. The second panel may include one or more second connector brackets, each of which may include one or more second receiving portions. The first and second receiving portions may collectively form a common opening. The coupling connector may be selectively secured in the common opening formed by the first and second receiving portions, thereby connecting together the first and second panels.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. For better understanding, the like elements have been designated by like reference numbers throughout the various accompanying figures. Understanding that these drawings depict only typical embodiments of the invention and are not therefore to be considered to be limiting of its scope, the invention will be described and explained with additional specificity and detail through the use of the accompanying drawings in which:

FIG. 2B illustrates an end view of a connector bracket of FIG. 2A;

FIGS. 2C-2D illustrate a coupling connector in accordance with one implementation of the present invention;

DETAILED DESCRIPTION OF THE PREFERRED EMBODIMENTS

Implementations of the present invention provide systems, methods, and apparatus for connecting panels, wall modules, modular walls, partitions and combinations thereof. Particularly, one or more implementations described herein may facilitate making quick and easy connections between panels, wall modules, modular walls, partitions and combinations thereof. Furthermore, at least one implementation may allow an installer to interconnect panels, wall modules, modular walls, partitions, while providing a pleasing aesthetic in a final structure.

At least one implementation includes connection hardware that may allow the installer to interconnect various portions of the wall modules, modular walls, panels, or partitions without posts. For instance, a post is typically used to connect and support wall modules. Aluminum extrusions commonly serve as such connecting posts, which allow the installer to connect panels and/or wall modules together. By contrast, the installer may use the connection hardware described herein for modular connections in lieu of or in addition to commonly used posts. It should be appreciated that a post may be substantially larger than the connection hardware disclosed herein. As such, eliminating one or more posts from modular walls and partitions may decrease manufacturing costs, simplify assembly, and improve the aesthetics of the modular walls or partitions.

In one or more implementations, an installer may selectively connect, disconnect, and reconnect elements or components with the connection hardware described herein. Additionally or alternatively, the connection hardware may allow the installer to connect adjacent wall modules or panels at any desired angle. Accordingly, the installer may subdivide an open space in a building to form individual spaces that may have any number of suitable shapes and configurations.

Figure 1A:
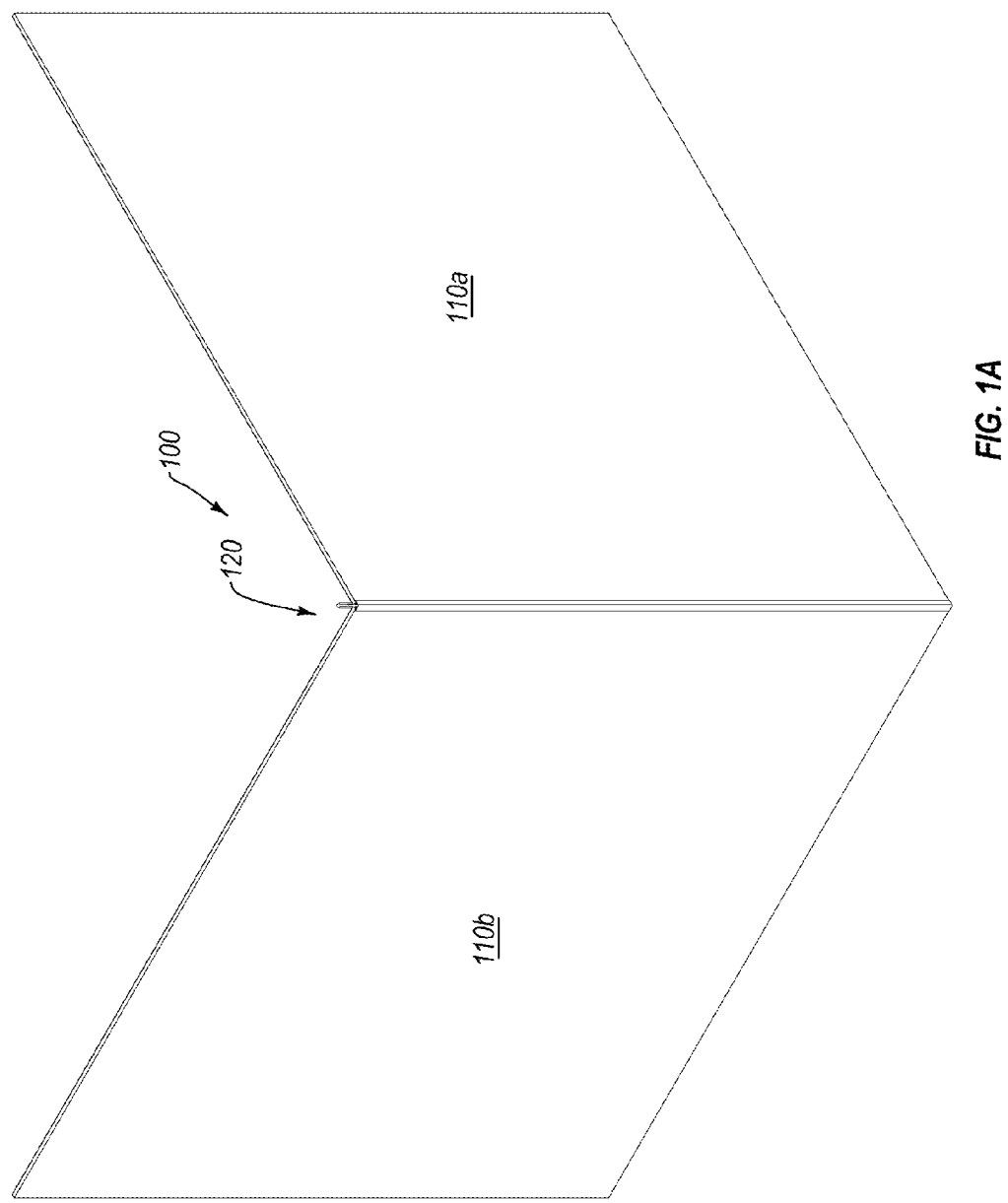
FIG. 1A illustrates a perspective view of a modular assembly in accordance with one implementation of the present invention.
Figure 1B:
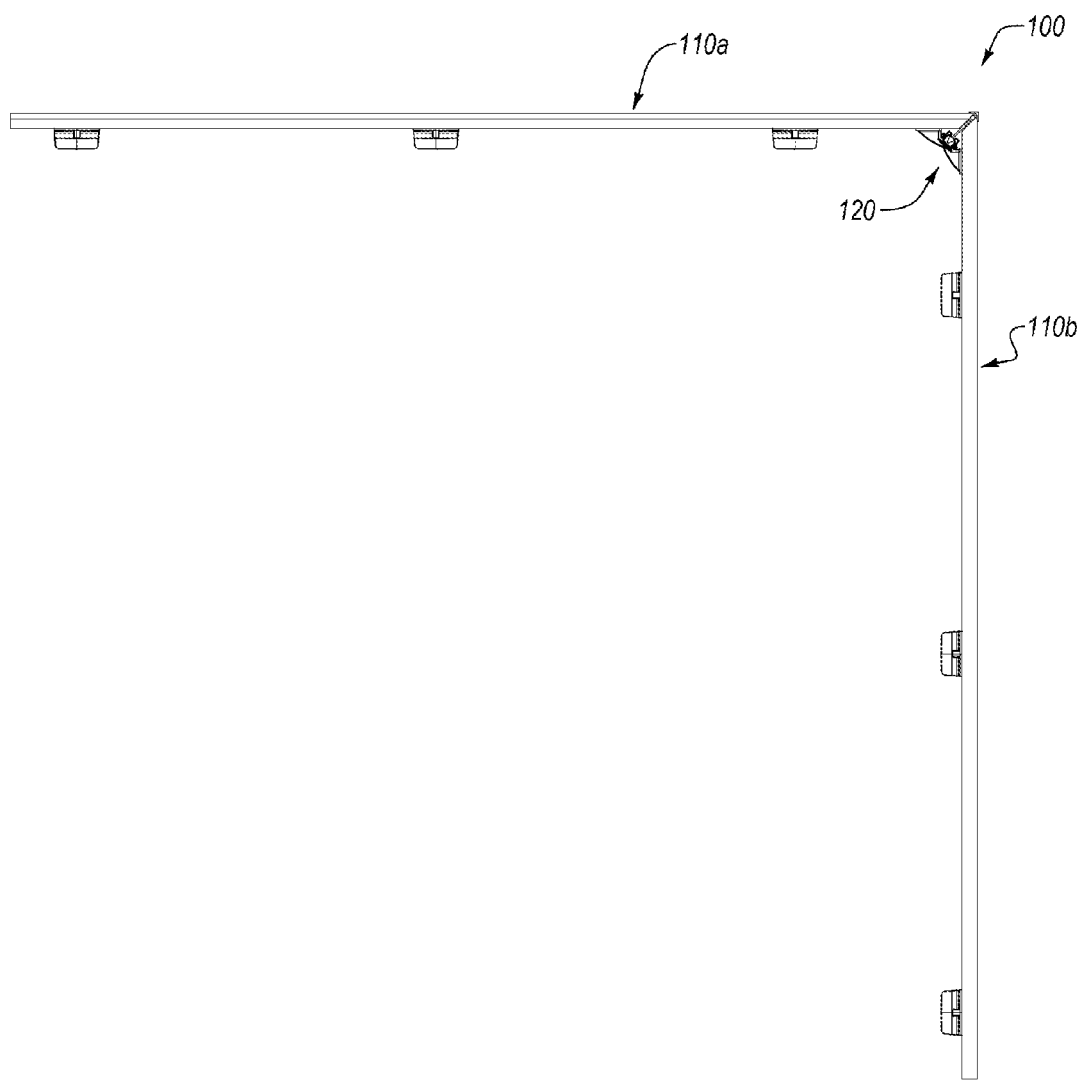
FIG. 1B illustrates a top view of the modular assembly of FIG. 1A.

In the examples illustrated in FIGS. 1A-1B, connection hardware connects two adjacent panels. Particularly, such implementation may include a modular assembly 100 that has a first panel 110a and a second panel 110b connected by connection hardware 120. As used herein, the term "modular assembly" includes assemblies that have connected wall modules and/or panels, such as modular walls and partitions. The panels 110a, 110b may be standalone panels (e.g., may form a partition or a modular wall or a portion thereof) or may be included in a wall module that incorporates a frame.

In one example, the frame of the wall module may include vertical and/or horizontal support members that can secure one or more panels. Moreover, the panels may connect to opposing sides of the frame and may form or define a space therebetween. In any event, however, one or more of the panels in the wall module also may include the same or similar components of the connection hardware 120 as the panels 110a, 110b. Consequently, the connection hardware 120 also may connect panels mounted on a frame and forming a wall module, thereby connecting adjacent wall modules and/or connecting a wall module with a panel or a partition that does not include a frame.

In one example, the modular assembly 100 may form a corner of an individual space (e.g., hallway, office, etc.). As mentioned above, the connection hardware 120 may connect the panels 110a, 110b at any number of suitable angles. For instance, the connection hardware 120 may connect the panels 110a, 110b at an approximately 90° angle. In one or more implementations, the connection hardware 120 may connect the panels 110a, 110b in a manner that forms an obtuse angle therebetween. Alternatively, the connection hardware 120 may connect the panels 110a, 110b to form an acute angle therebetween.

Furthermore, the connection hardware 120 may include components that form a snap-in connection therebetween. Thus, in some instances, the installer may detachably connect the panels 110a, 110b with the connection hardware 120. In other words, the snap-in components of the connection hardware 120 may snap together to connect the panels 110a, 110b. Conversely, to detach the panels 110a, 110b, the installer may remove or un-snap the snap-in components, thereby disconnecting the panels 110a, 110b.

Figure 2A:
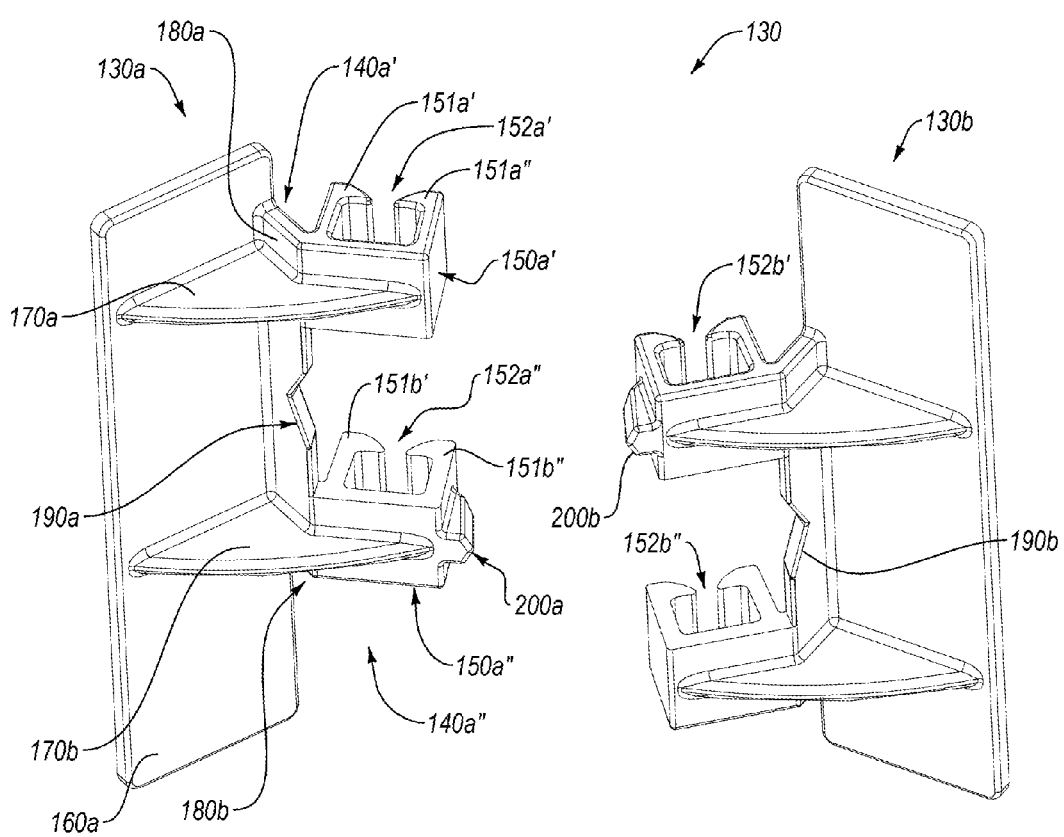
FIG. 2A illustrates connector brackets in accordance with one implementation of the present invention.

In one implementation, the connection hardware may include connector brackets 130, illustrated in FIGS. 2A-2B. For example, the connection hardware may include a left-side connector bracket 130a and a right-side connector bracket 130b. References to "left-side" and "right-side" are made for convenience of description only. Accordingly, the left-side connector bracket 130a and the right-side connector bracket 130b may couple to respective left and right panels (e.g., as viewed from back sides thereof) and vice versa. Moreover, for convenience of description, reference will be made to connector bracket 130a. It should be appreciated, however, that the connector bracket 130b and its materials and elements may be similar to or the same as the connector bracket 130a and its respective materials and elements.

In at least one implementation, the connector bracket 130a may include two panel-side connectors 140a', 140a" that may be coupled to a coupling connector, which is discussed below. More specifically, the panel-side connectors 140a', 140a" may be female snap-in type connectors, which may accept a corresponding male snap-in coupling connector. In additional or alternative implementations, the panel-side connectors may be male snap-in connectors that may fit into one or more corresponding female connectors. Furthermore, the number of the panel-side connectors on the connector bracket 130a may vary from one implementation to another and may depend on, among other things, the panel size, strength requirements, etc. Hence, the connector bracket 130a may include a single panel-side connector (e.g., panel-side connector 140a' or 140a") or multiple panel-side connectors (e.g., two, three, four, etc.), which may be similar or identical to the panel-side connectors 140a', 140a".

Likewise, the particular size of the panel-side connectors 140a', 140a" may be different in different implementations. Also, the spacing between the panel-side connectors 140a', 140a" may vary among various implementations. In any case, however, the panel-side connectors 140a', 140a" may have a suitable size and spacing therebetween to provide sufficient coupling strength for the connection hardware. The panel-side connectors 140a', 140a" may also be sufficiently spaced apart to allow for one or more panel-side connectors from the right side connector bracket 130b to fit between the panel-side connectors 140a', 140a" so that the panel-side connectors of the connector brackets 130a, 130b overlap each other in a stacked manner as described below.

In one implementation, the panel-side connectors 140a', 140a" may have respective receiving portions 150a', 150a", which may accept the corresponding snap-in coupling connector (e.g. a male snap-in coupling connector). More specifically, the receiving portions 150a', 150a" may include resilient hook-like protrusions 151a', 151a", 151b', 151b", which may deflect and snap about a male snap-in coupling connector (described below). Consequently, the installer may insert the male snap-in coupling connector into the receiving portions 150a', 150a". Moreover, inserting the male snap-in coupling connector into the receiving portions 150a', 150a" and into corresponding receiving portions on right side connector bracket 130b may secure together two connector brackets (and two adjacent panels).

In one example, the receiving portions 150a', 150a" may have approximately square cross-section or cubic configurations with openings 152a', 152a" formed by the resilient hook-like protrusions 151a', 151a", 151b', 151b". Hence, the male snap-in coupling connector may fit into the openings 152a', 152a" and between the resilient hook-like protrusions 151a', 151a", 151b', 151b", which may secure the male snap-in coupling connector within the respective openings 152a', 152a".

It should be appreciated that the connector bracket 130a and/or the resilient hook-like protrusions 151a', 151a", 151b', 151b" may include any number of suitable materials. In one example the resilient hook-like protrusions 151a', 151a", 151b', 151b" may comprise resilient material that can allow the resilient hook-like protrusions 151a', 151a", 151b', 151b" to flex outward and snap around the coupling connector. Alternatively, the resilient hook-like protrusions 151a', 151a", 151b', 151b" may comprise material that may be substantially rigid, whereby the resilient hook-like protrusions 151a', 151a", 151b', 151b" may compress the coupling connector as the coupling connector enters the openings 152a', 152a". Examples of suitable materials include but are not limited to plastics, aluminum, steel, etc.

The connector bracket 130a also may include a mounting plate 160a. The mounting plate 160a may connect the connector bracket 130a to the panel or to a portion of a wall module. For example, the installer may fasten, glue, or otherwise secure the connector bracket 130a to the panel and/or to a portion of the wall module. In some implementations, a mounting plate may include mounting features that facilitate the connection of the connector bracket to the panel. For instance, as shown in FIG. 2B, mounting plate 160a may include one or more projections 153a that can be inserted into corresponding receptacle(s) in an associated panel. The projection(s) 153a and corresponding receptacle(s) may be configured to create a snap-fit or friction-fit connection between the connector bracket 130a and the associated panel. Additionally, the projection(s) 153a and corresponding receptacle(s) may facilitate proper alignment between the connector bracket 130a and the associated panel. In any event, the connection between the connector bracket 130a and the panel may be permanent, semi-permanent, or detachable. Furthermore, an inside face of the mounting plate 160a may be approximately flush with at least a portion of the panel or a wall module and may be connected thereto.

The panel-side connectors 140a', 140a" may connect to the mounting plate 160a in any number of suitable ways and configurations. In one instance, the connector bracket 130a may include angled plates 170a, 170b, which may connect the panel-side connectors 140a', 140a" to the mounting plate 160a. Additionally or alternatively, the panel-side connectors 140a', 140a" may include standoffs 180a, 180b, which may connect and/or support or reinforce the panel-side connectors 140a', 140a" on the mounting plate 160a. In any case, the panel-side connectors 140a', 140a" may couple to the mounting plate 160a, such that the panel-side connectors 140a', 140a" have sufficient strength and provide sufficient coupling to the panels.

The resilient hook-like protrusions 151a', 151a", 151b', 151b" of the panel-side connectors 140a', 140a" may have a desired orientation relative to the mounting plate 160a. The orientation between the hook-like protrusions 151a', 151a", 151b', 151b" and the mounting plate 160a may at least partially determine the angle formed between adjacent panels. The connector brackets 130 may couple adjacent panels together at any number of angles relative to one another. For example, the resilient hook-like protrusions 151a', 151a" may be oriented at angles θ', θ", respectively, relative to mounting plate 160a. Similarly, while not shown in FIG. 2B, hook-like protrusions 151b', 151b" may also be oriented at angles θ', θ", respectively, relative to mounting plate 160a.

In the illustrated implementation, angles θ', θ" are approximately 45° relative to the mounting plate 160a. Accordingly, the male connector may connect to the connector bracket 130a at an approximately 45° angle relative to the mounting plate 160a (and at approximately the same angle relative to the panel that secures the connector bracket 130a). In implementations where the connector bracket 130b is configured similarly to the connector bracket 130a (e.g., is formed with the same angles between the hook-like protrusions and the mounting plate), then the panels connected together with the connection hardware will form an approximately 90°.

In some implementations, angles θ', θ" are equal to one another. In other implementations, such as that illustrated in FIG. 2B, angles θ', θ" are different from one another. As can be seen in FIG. 2B, forming θ' smaller than θ" causes the free ends of the hook-like protrusions 151a', 151a" to be angled towards one another. Such a configuration may facilitate better securement between the connector bracket 130a and the male connector.

The connector brackets 130a, 130b may also include alignment features, which may align the connector bracket 130a relative to the connector bracket 130b, and, thus, align adjacent panels secured to the connector brackets 130a, 130b. For instance, as shown in FIG. 2A, the connector bracket 130a may include a cutout 190a and a protrusion 200a. In one implementation, the protrusion 200a may be located on the receiving portion 150a". Similarly, the connector bracket 130b may include a cutout 190b and a protrusion 200b. As described below, the protrusion 200a may fit into the cutout 190b and the protrusion 200b may fit into the cutout 190a, thereby aligning the connector bracket 130a relative to the connector bracket 130b. Furthermore, aligning the connector brackets 130a, 130b together also may align the respective openings 152a', 152a", 152b', 152b" in a manner that the male coupling connector may enter the openings 152a', 152a", 152b', 152b" and secure together the connector brackets 130a, 130b.

As mentioned above, the connection hardware 120 may also include a coupling connector. The particular configuration of the coupling connector may vary from one implementation to the next. FIGS. 2C-2D illustrate one example of a male snap-in coupling connector 210. The coupling connector 210 may have any desired length, which may span along the entire lengths of adjacent panels or portions thereof. For instance, the manufacturer may extrude the coupling connector 210 to any desired length, which may be further adjusted (i.e., shortened) during installation. In any event, as described below, the coupling connector 210 may connect connector brackets (e.g., connector brackets 130a, 130b, FIG. 2A) together, thereby coupling together the panels (or wall modules) associated with the connector brackets.

In one or more implementations, the coupling connector 210 may include a connection portion 220. More specifically, the connection portion 220 may include front-facing angled sides and back-facing angled sides. As such, the connection portion 220 may enter and snap into the panel-side connectors on the connector brackets. It should be appreciated that the connection portion 220 may have any number of suitable configurations (e.g., the front- and/or back-facing angled sides may have any number of suitable angles). In any event, however, the connection portion 220 may snap into the panel-side connectors.

Additionally, the coupling connector 210 may include a covering portion 230. In one implementation, the covering portion 230 may cover or conceal any gap between the adjacent panels connected by the connection hardware. For example, the covering portion 230 may have two protruding portions 231', 231" that may extend away from one another at an angle that approximates the desired angle between the connected panels.

Also, the coupling connector 210 may include a center portion 240, which may connect to the connection portion 220 on a front end thereof and to the covering portion 230 on the back end thereof. The installer may position the center portion 240 between the adjacent panels, thereby providing separation therebetween. In some implementations, the center portion 240 may also include point separators 241, 242, 243, 244, which may provide separation between the panels. More specifically, the panels may contact the center portion 240 at the point separators 241, 242, 243, 244 in lieu of contacting the center portion 240 along an entire length thereof (e.g., along the entire length of the center portion 240 that spans between the covering portion 230 and the connection portion 220).

For instance, the point separators 241, 242, 243, 244 may have a semicircular cross-section, each thereby providing a single point of contact for each adjacent panel (or a line along the extruded length of the coupling connector 210). As such, the coupling connector 210 may have two points (or lines) of contact for each panel, which may minimize or eliminate misalignment between the coupling connector 210 and each adjacent panel. Particularly, because each panel contacts the center portion 240 along two points (at any given cross-section), misalignment between the coupling connector 210 and the panels, which may be caused by variance or manufacturing defects along the length of the center portion 240, may be minimized or eliminated.

Figure 3A:
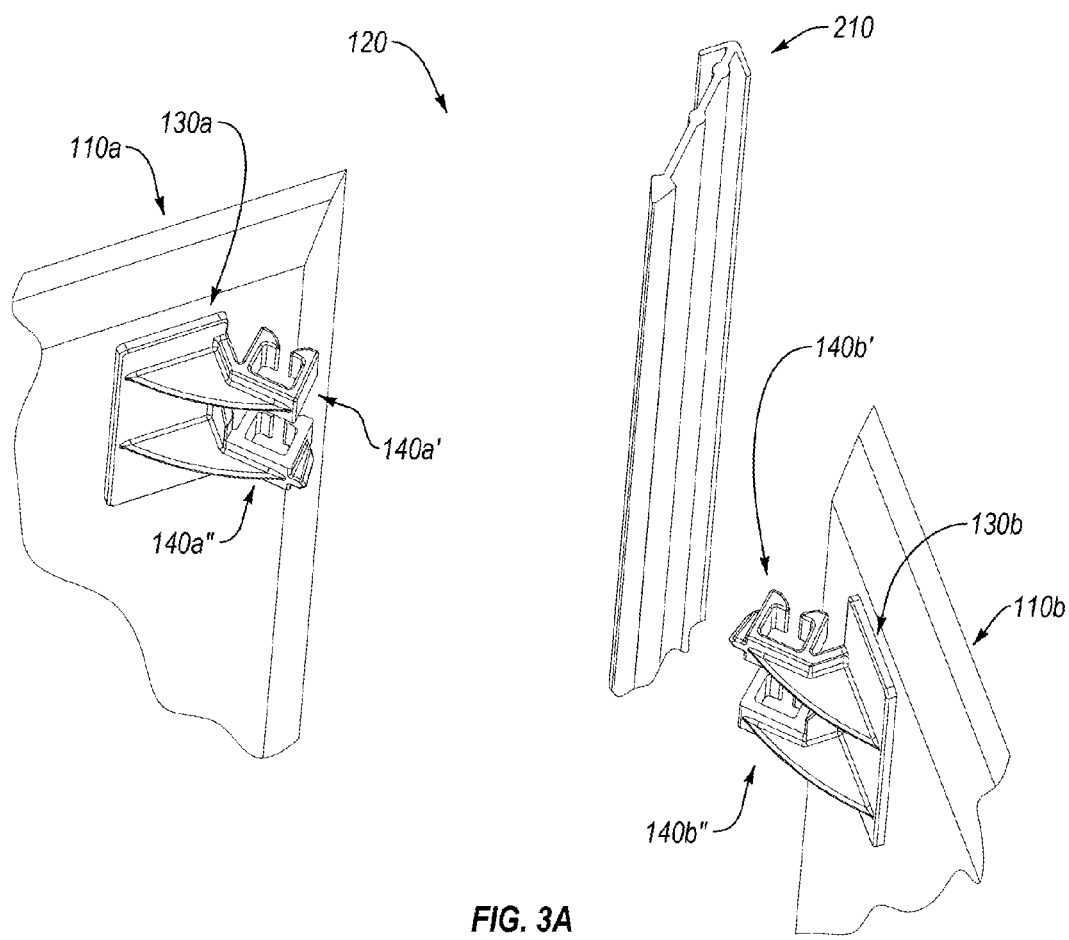
FIGS. 3A-3B illustrate two panels and connection hardware in accordance with one implementation of the present invention.
Figure 3B:
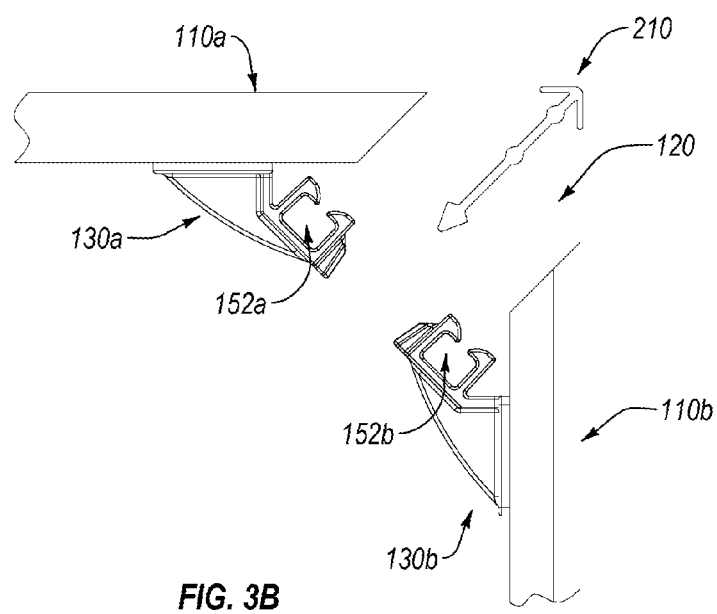
Figure 3C:
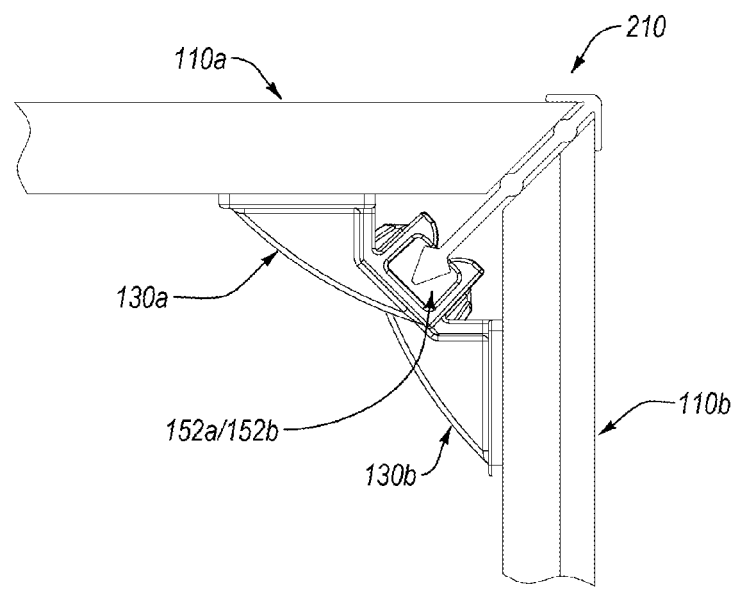
FIGS. 3C-3D illustrate two panels connected by connection hardware in accordance with one implementation of the present invention.
Figure 3D:
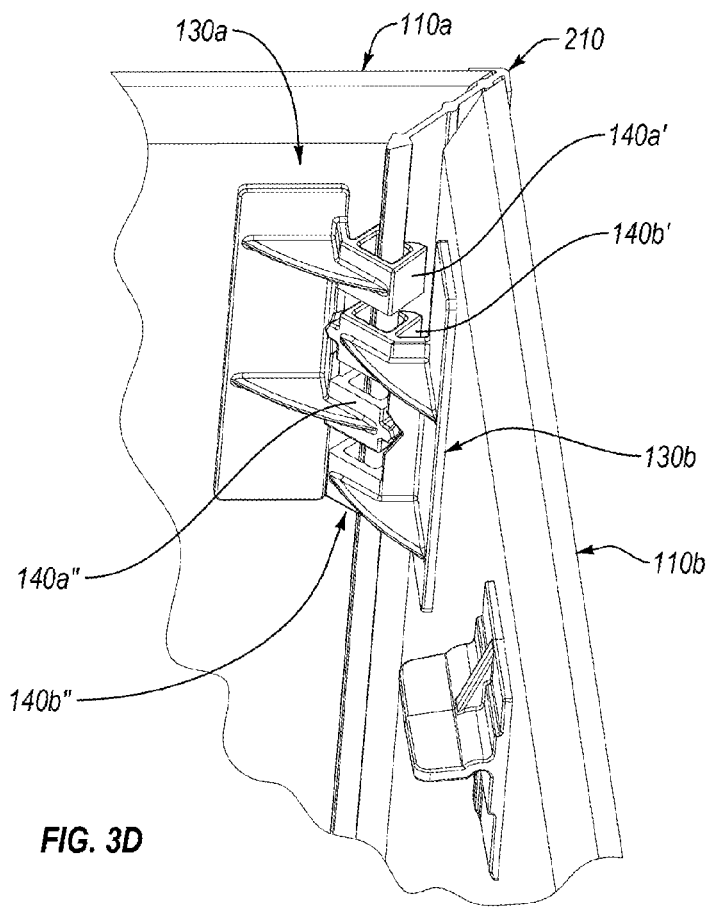

FIGS. 3A-3D illustrate an exemplary connection between two adjacent panels, as provided by the connection hardware 120. Specifically, as mentioned above, the connection hardware 120 may include connector brackets 130a, 130b, which may connect to the adjacent panels 110a, 110b, and the coupling connector 210 that may couple together the connector brackets 130a, 130b. FIGS. 3A-3B illustrate the panels 110a, 110b aligned at an approximately 90° angle relative to each other. As such, the openings 152a, 152b may be aligned at an approximately 45° angle relative to front faces of the panels 110a, 110b, respectively. In any event, the openings 152a, 152b may be aligned in a manner that allows the installer to insert the coupling connector 210 therein, to connect the connector brackets 130a, 130b (and the panels 110a, 110b) together, as shown in FIGS. 3C-3D.

In addition, as best seen in FIG. 3D, the connector brackets 130a, 130b may align in a manner that the panel-side connectors 140a', 140a" of the connector bracket 130a and panel-side connectors 140b', 140b" of the connector bracket 130b overlap each other in a stacked manner. In one example, the stacked manner may result in the panel-side connector 140b" being positioned in the lowermost position along the height of the junction between the panels 110a, 110b. The panel-side connector 140a" may have a subsequent, higher position along the height, the panel-side connector 140b' even higher, and the panel-side connector 140a' may have the topmost position along the height of the junction between the panels 110a, 110b.

In any case, as shown in FIG. 3C, when aligned and placed together, the connector brackets 130a, 130b may form a common opening 152a/152b, which may accept the coupling connector 210 therein. Moreover, as mentioned above, the coupling connector 210 may connect together the connector brackets 130a, 130b, thereby connecting together the panels 110a, 110b.

Figure 4A:
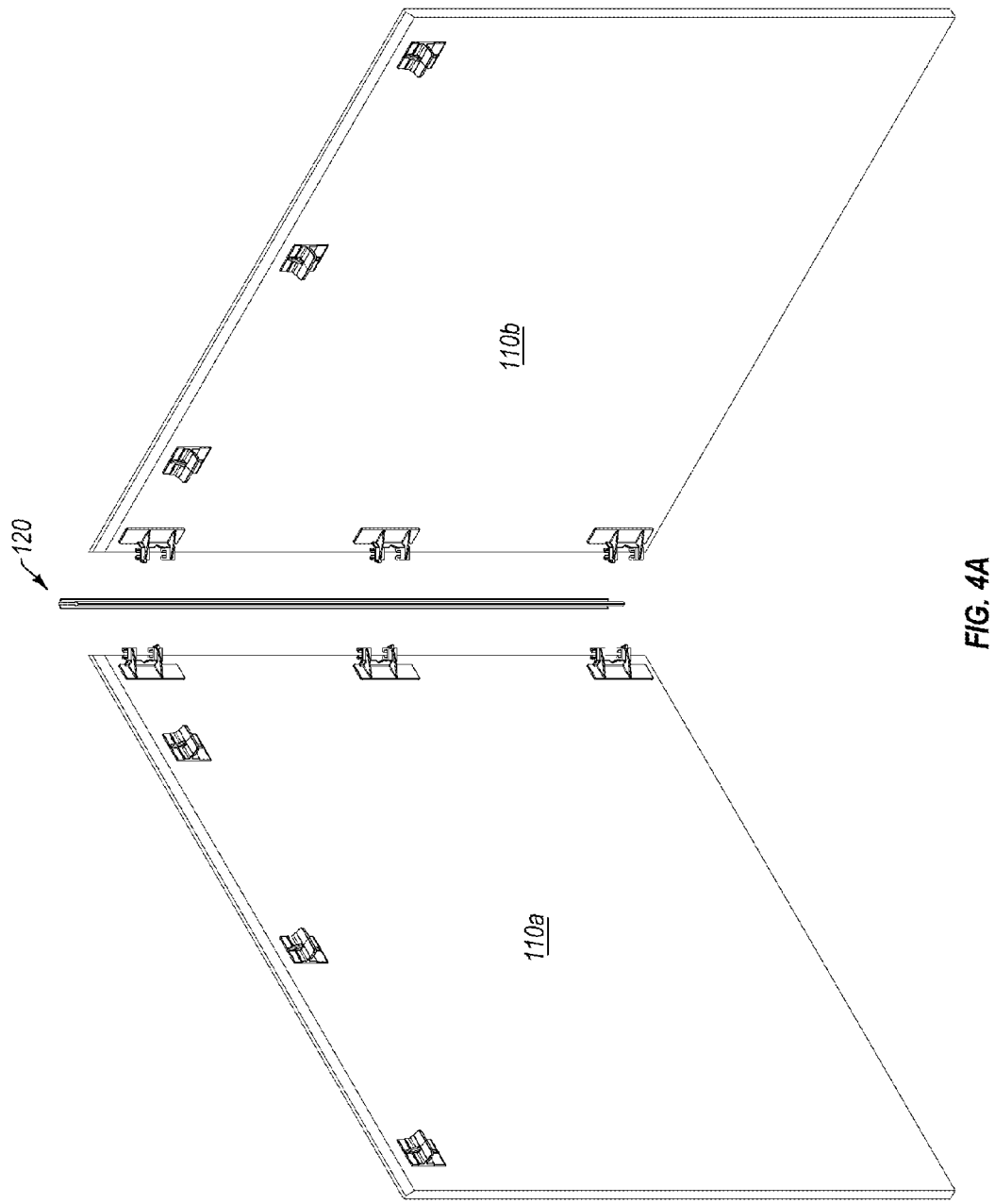
FIGS. 4A-4C illustrate a sequence of acts or steps for connecting two panels with connection hardware in accordance with one implementation of the present invention.
Figure 4B:
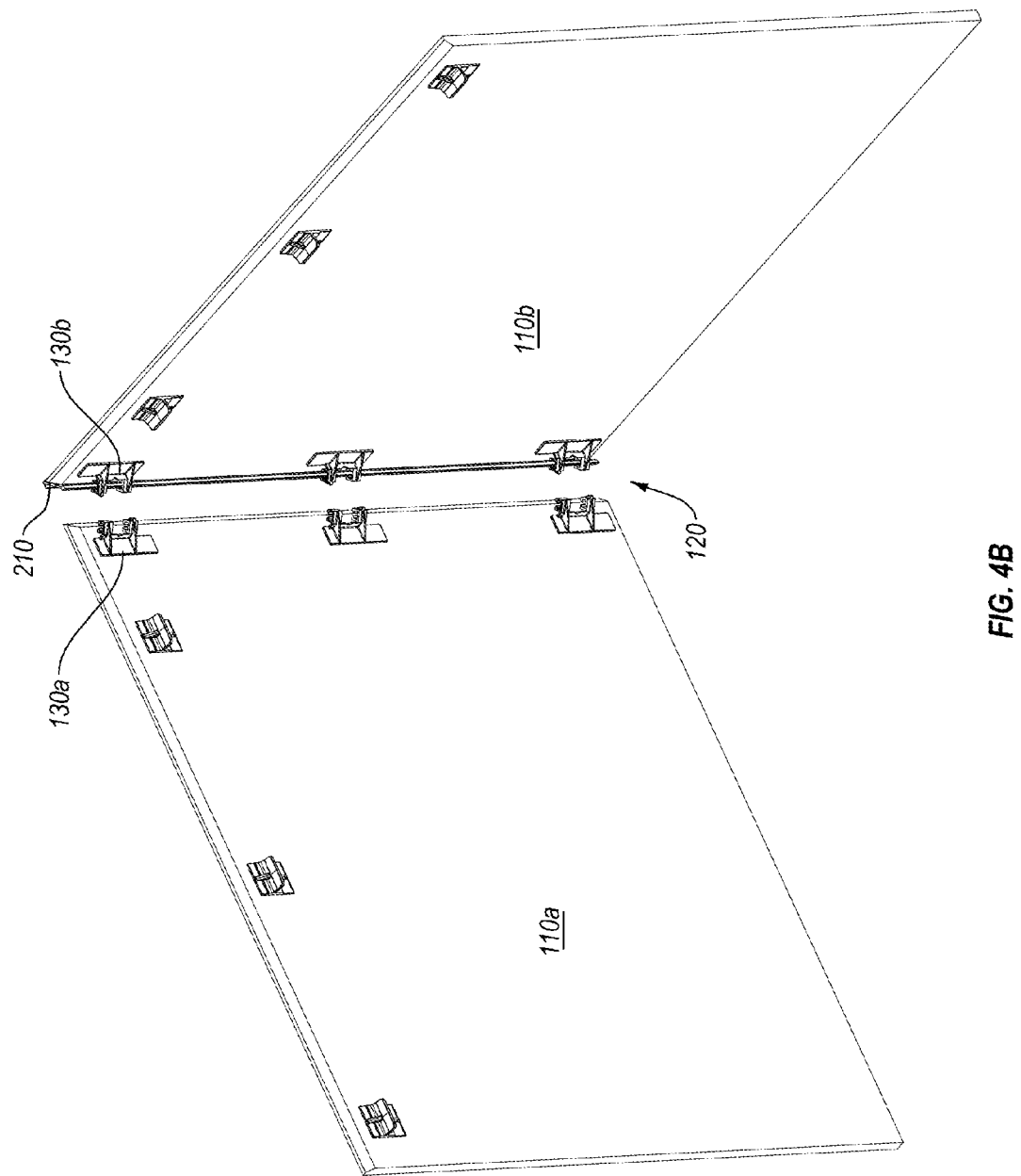
Figure 4C:
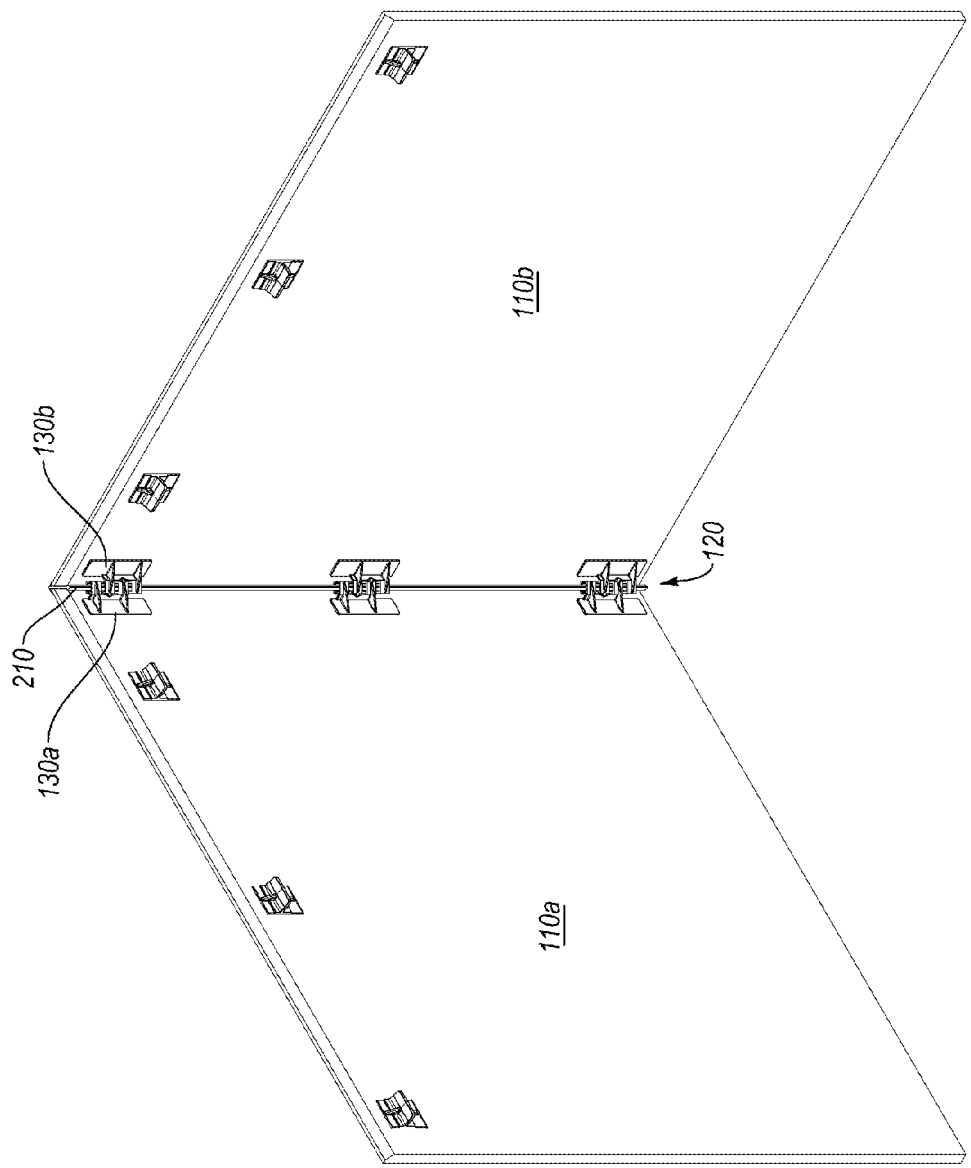

The installer may connect the panels 110a, 110b with the connection hardware 120 in any number of suitable ways. FIGS. 4A-4C illustrate one sequence of acts or steps that may connect together the panels 110a, 110b using the connection hardware 120. Particularly, the installer may position the panels 110a, 110b at approximately or near desired locations (FIG. 4A). Subsequently, the installer may connect or snap-in the coupling connector 210 to or into the connector bracket 130b connected to the panel 110b (FIG. 4B). As mentioned above, the panel 110a and/or the panel 110b may include any number of respective connector brackets 130a, 130b along their respective heights. Also, it should be appreciated that the installer may first snap-in the coupling connector 210 into the connector bracket 130a.

In any event, after snapping the coupling connector 210 into the connector bracket 130a or into the connector bracket 130b, the installer may connect the other of the connector bracket 130b or the connector bracket 130a with the coupling connector 210. For example, the installer may move the panel 110a relative to the coupling connector 210 and may snap the coupling connector 210 into the connector bracket 130a secured to the panel 110a (FIG. 4C).

Figure 5A:
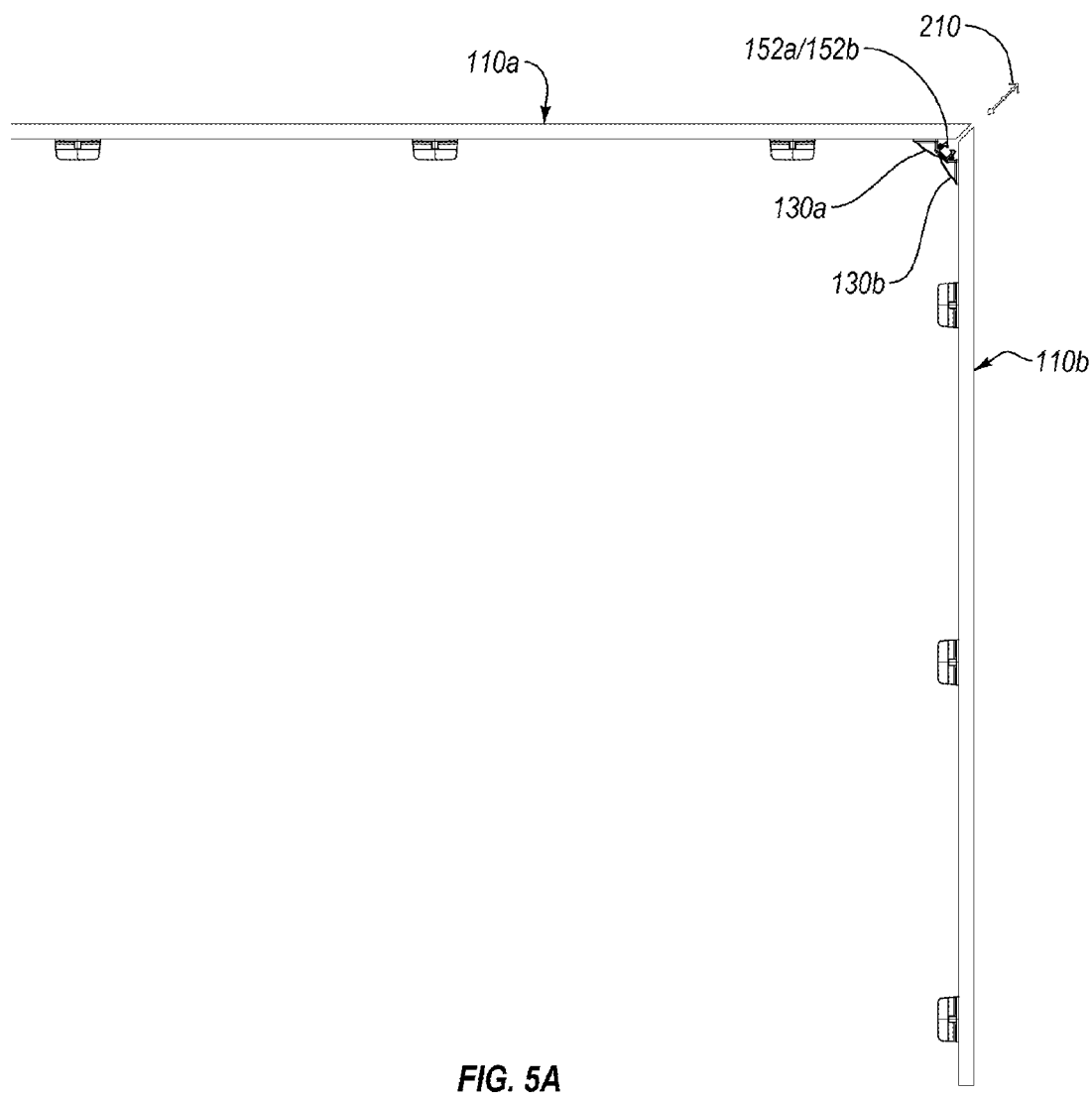
FIGS. 5A-5B illustrate a sequence of acts or steps for connecting two panels with connection hardware in accordance with another implementation of the present invention.
Figure 5B:
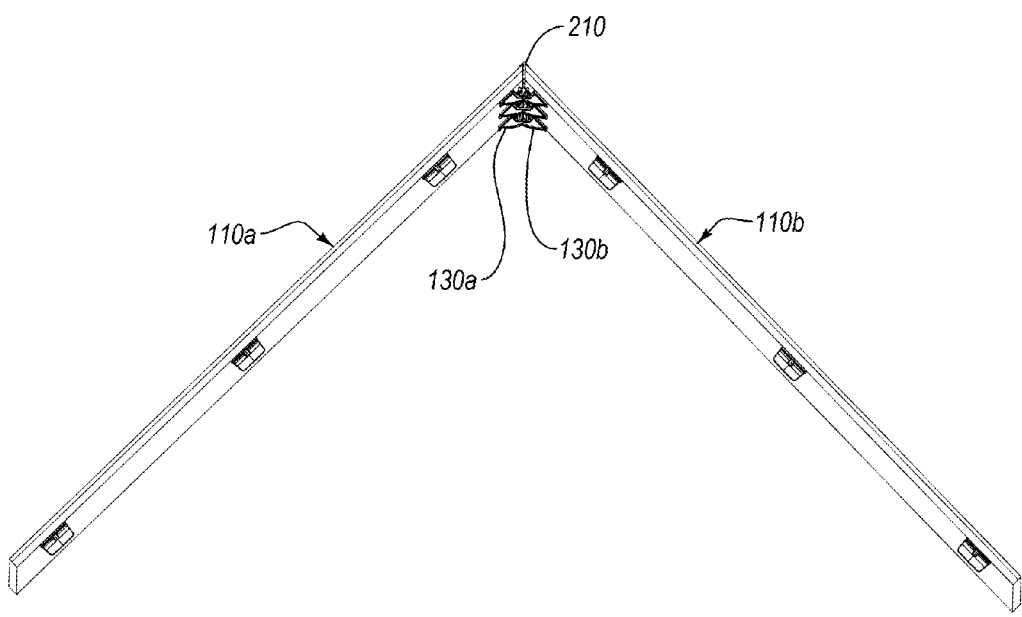

As noted above, there are many sequences of steps or acts for connecting adjacent panels. Hence, this disclosure is not limited to the particular sequence of acts described above. For example, FIGS. 5A-5B illustrate acts or steps of an alternative implementation of a method for connecting together the panels 110a, 110b.

Specifically, the installer may first align the panels 110a, 110b together, in a manner that the connector brackets 130a, 130b overlap and alight together (FIG. 5A), as described above. In other words, when aligned together, the connector brackets 130a, 130b may form the common opening 152a/152b therebetween, which may accept the coupling connector 210 therein. Subsequently, the installer may insert the coupling connector 210 into the common opening 152a/152b (FIG. 5B), thereby securing together the connector brackets 130a, 130b and the panels 110a, 110b.

Figure 6:
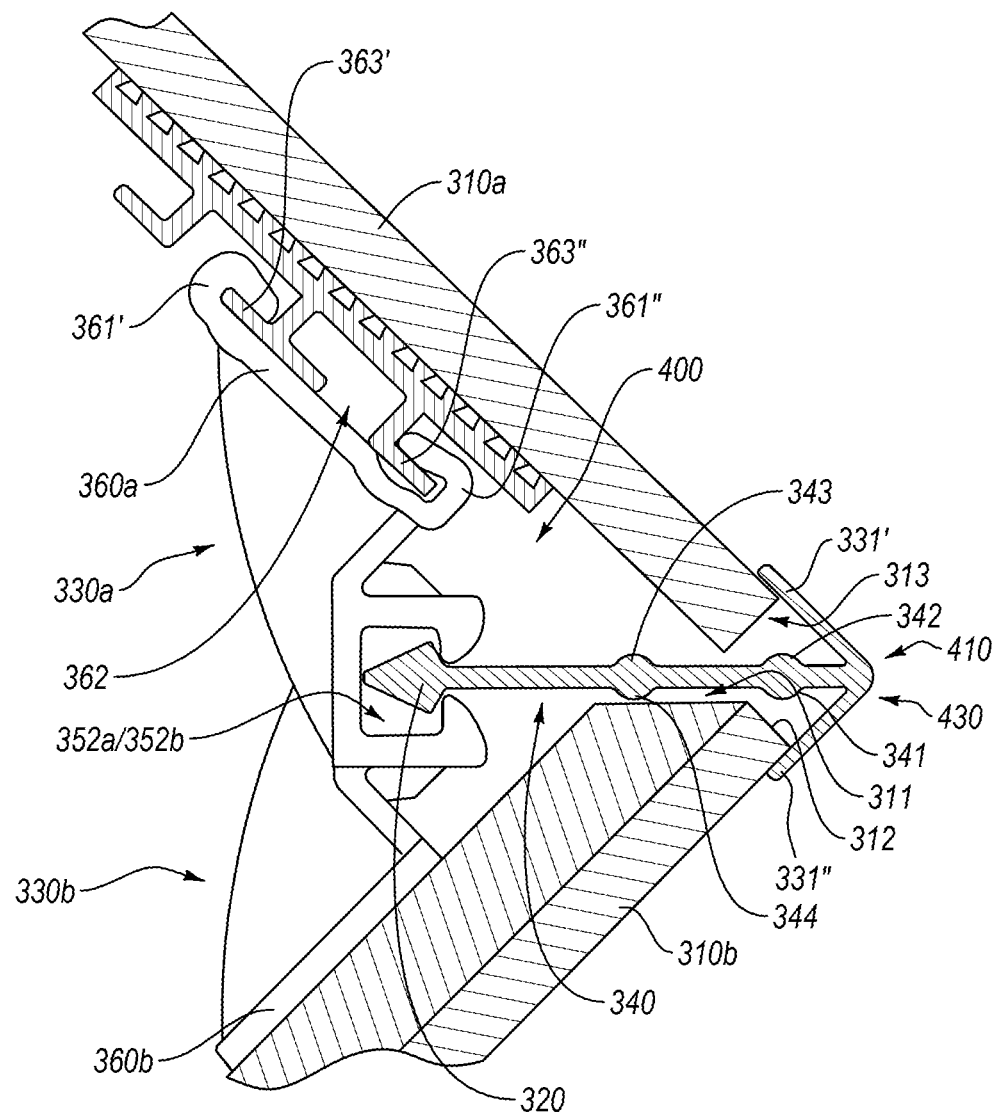
FIG. 6 illustrates two panels connected by connection hardware in accordance with another implementation of the present invention.

Attention is now directed to FIG. 6, which illustrates panels 310a, 310b connected together with connection hardware 400 according to another implementation of the present invention. Except as otherwise described herein, the panels 310a, 310b and the connection hardware 400 and their respective configurations, materials, elements, or components can be similar to or the same as the panels 130a, 130b and the connection hardware 210 (FIGS. 1A-5B) and their respective configurations, materials, elements, and components.

As can be seen in FIG. 6, a left side connector bracket 330a is connected to the panel 310a and a right side connector bracket 330b is connected to the panel 310b. Similar to coupling connector 210, a coupling connector 410 connects the connector brackets 330a, 330b together, thereby connecting the panels 310a, 310b. More specifically, a connection portion 320 of the coupling connector 410 is inserted into the common opening 352a/352b formed by the connector brackets 330a, 330b to connect the connector brackets 330a, 330b together.

The connector brackets 330a, 330b include mounting plates 360a, 360b, respectively. The mounting plate 360b may be similar or identical to the mounting plate 160a. For instance, the mounting plate 360b may be fastened, glued, or otherwise secured to the panel 310b. In some implementations, the mounting plate 360b may include mounting features that facilitate the connection of the connector bracket 330b to the panel 310b. For instance, the mounting plate 360b may include one or more projections (similar or identical to projection(s) 153a) that can be inserted into corresponding receptacle(s) in the panel 310b. The projection(s) and corresponding receptacle(s) may be configured to create a snap-fit or friction-fit connection between the connector bracket 330b and the panel 310b. Additionally, the projection(s) and corresponding receptacle(s) may facilitate proper alignment between the connector bracket 330b and the panel 310b. In any event, the connection between the connector bracket 330b and the panel 310b may be permanent, semi-permanent, or detachable. Furthermore, an inside face of the mounting plate 360b may be approximately flush with at least a portion of the panel 310b.

The mounting plate 360a may also be similar or identical to the mounting plates 160a, 360b. In other implementations, the mounting plate 360a may have other configurations. For instance, as shown in FIG. 6, the mounting plate 360a includes clips portions 361', 361" that cooperate to form an open channel 362. The open channel 362 is configured to receive one or more rails 363 (e.g., rails 363', 363") therein and the clip portions 361', 361" are configured to hold the connector bracket 330a on the one or more rails 363. In some embodiments, the connector bracket 330a is adapted to slide along at least a portion of the length of the one or more rails 363. In any case, the one or more rails 363 may be secured to the panel 310a (e.g., via adhesive, fastener, friction fit, etc.) so as to secure the connector bracket 330a to the panel 310a when the mounting plate 360a is mounted on the one or more rails 363. It will be understood that connector bracket 360b may having a mounting plate similar or identical to the mounting plate 360a.

Similar to coupling connector 310, coupling connector 410 includes a connection portion 320, a covering portion 430, and a center portion 340 that extends between the connection portion 320 and the covering portion 430. The connection portion 320 may include front-facing angled sides and back-facing angled sides. As such, the connection portion 320 may enter and snap into the common opening 352a/352b formed by the connector brackets 330a, 330b to secure the connector brackets 330a, 330b together.

In some implementations, the center portion 340 may also include point separators 341, 342, 343, 344, which may provide separation between the panels 310a, 310b. In some instances, the panels may contact the center portion 340 at the point separators 341, 342, 343, 344 in lieu of contacting the center portion 340 along an entire length thereof (e.g., along the entire length of the center portion 340 that spans between the covering portion 430 and the connection portion 320). As seen in FIG. 6, for instance, the panel 310b has an edge that includes a chamfered portion 311 and a squared portion 312. The chamfered portion 311 contacts the point separator 344. In contrast, the panel 310a has a standard square edge 313 which may or may not contact either of the point separators 342, 343 or the center portion 340.

In one implementation, the covering portion 430 may cover or conceal any gap between the edges of the panels 310a, 310b connected by the connection hardware 400. For example, the covering portion 430 may have two protruding portions 331', 331" that may extend away from one another at an angle that approximates the desired angle between the connected panels 310a, 310b. The protruding portions 331', 331" may be longer than the protruding portions 231', 231" of the coupling connector 210 in order to cover a larger gap between panels 310a, 310b or to accommodate panels with different types of edges.

For instance, each of the panels 110a, 110b (FIG. 3A-3D) includes a chamfered edge that allows for the panels 110a, 110b to be secured relatively closely together while creating a relatively small gap therebetween. In contrast, the squared edge portion 312 of the panel 310b and the squared edge 313 of the panel 310a result in a larger gap being formed between the panels 310a, 310b. Nevertheless, protruding portions 331', 331" may be long enough to cover or conceal the gap formed between the panels 310a, 310b despite the different edge configurations of the panels 310a, 310b.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A connector bracket for connecting together adjacent panels or wall modules that each have at least one chamfered edge, the connector bracket comprising:
   a mounting plate;
   one or more receiving portions connected to the mounting plate, each of the one or more receiving portions including opposing hook-like protrusions that form one or more openings in the one or more receiving portions, the one or more openings being sized and configured to receive a coupling connector, and the one or more receiving portions being oriented at a predetermined angle relative to the mounting plate; and
   one or more standoffs that connect the one or more receiving portions to the mounting plate,
   wherein the coupling connector comprises a center portion that extends through a gap between adjacent edges of the panels or wall modules, such that the center portion extends from a first side of the panels or wall modules to a second side of the panels or wall modules,
   wherein the coupling connector comprises a connection portion at a first end of the center portion, the connection portion being selectively securable in the common opening formed by the one or more receiving portions and on the first side of the panels or wall modules, and
   wherein the coupling connector comprises a covering portion at a second end of the center portion, such that the covering portion is disposed on a second side of the panels or wall modules.

2. The connector bracket as recited in claim 1, wherein the opposing hook-like protrusions are oriented at an angle of approximately 45° relative to the mounting plate.

3. The connector bracket as recited in claim 1, wherein a first hook-like protrusion of the opposing hook-like protrusions is oriented at a first angle relative to the mounting plate and a second hook-like protrusion of the opposing hook-like protrusions is oriented at a second angle relative to the mounting plate, the second angle being different than the first angle.

4. The connector bracket as recited in claim 1, further comprising one or more angled plates that connect the one or more receiving portions to the mounting plate.

5. The connector bracket as recited in claim 1, further comprising a protrusion configured to engage a cutout in another connector bracket to facilitate alignment of the connector bracket with the another connector bracket.

6. The connector bracket as recited in claim 5, wherein the protrusion extends from one of the one or more receiving portions.

7. The connector bracket as recited in claim 1, wherein the mounting plate comprises one or more mounting features that facilitate the connection of the connector bracket to a panel or wall module.

8. The connector bracket as recited in claim 1, wherein the mounting plate comprises one or more clip portions that facilitate mounting of the connector bracket onto one or more rails.

9. Connection hardware for connecting adjacent panels or wall modules that each have at least one chamfered edge, the connection hardware comprising:
   a coupling connector;
   a first connector bracket including one or more first receiving portions sized and configured to receive the coupling connector; and
   a second, same connector bracket including one or more second receiving portions sized and configured to receive the coupling connector, the one or more first and second receiving portions being sized and configured to align relative to each other in a manner that the coupling connector can connect together the first and second connector brackets;
   wherein the first and second connector brackets comprise corresponding protrusions and cutouts that facilitate alignment of the first and second connector brackets,
   wherein the coupling connector comprises a center portion that extends through a gap between adjacent edges of the panels or wall modules, such that the center portion extends from a first side of the panels or wall modules to a second side of the panels or wall modules,
   wherein the coupling connector comprises a connection portion at a first end of the center portion, the connection portion being selectively securable in the common opening formed by the one or more receiving portions and on the first side of the panels or wall modules, and
   wherein the coupling connector comprises a covering portion at a second end of the center portion, such that the covering portion is disposed on a second side of the panels or wall modules.

10. The connection hardware as recited in claim 9, wherein the coupling connector comprises a connection portion sized and configured to be inserted into the one or more first and second receiving portions.

11. The connection hardware as recited in claim 9, wherein the coupling connector comprises a covering portion having two protruding portions extending away from a center portion.

12. The connection hardware as recited in claim 9, wherein the one or more first and second receiving portions cooperate to form a common opening that is sized and configured to receive the coupling connector therein.

13. The connection hardware as recited in claim 9, wherein each of the one or more first and second receiving portions comprises a set of opposing hook-like protrusions.

14. The connection hardware as recited in claim 9, wherein the first connector bracket comprises a mounting plate.

15. The connection hardware as recited in claim 14, wherein the mounting plate comprises one or more projections that facilitate the connection of the first connector bracket to a panel or wall module.

16. The connection hardware as recited in claim 9, wherein the second connector bracket comprises a mounting plate having one or more clip portions that facilitate mounting of the second connector bracket onto one or more rails.

17. The connection hardware as recited in claim 9, wherein coupling connector comprises a connection portion, a covering portion, and a center portion that extends between the connection portion and the covering portion.

18. The connection hardware as recited in claim 17, wherein the center portion comprises one or more point separators.

19. The connection hardware as recited in claim 18, wherein the one or more point separators comprise a semicircular cross-section.

20. A modular assembly for subdividing open space in a building into one or more individual spaces, the modular assembly comprising:
   a first panel including one or more first connector brackets each including one or more first receiving portions;
   a second panel including one or more second connector brackets each including one or more second receiving portions, the first and second receiving portions collectively forming a common opening; and a coupling connector selectively securable in the common opening formed by the first and second receiving portions, thereby connecting together the first and second panels;

wherein the first panel and the second panel each comprise a chamfered edge, wherein the coupling connector comprises a center portion that extends through a gap between adjacent edges of the first and second panels, such that the center portion extends from a first side of the first and second panels to a second side of the first and second panels, wherein the coupling connector comprises a connection portion at a first end of the center portion, the connection portion being selectively securable in the common opening formed by the first and second receiving portions and on the first side of the first and second panels, and wherein the coupling connector comprises a covering portion at a second end of the center portion, such that the covering portion is disposed on a second side of the first and second panels.

21. The modular assembly as recited in claim 20, wherein the first panel comprises a squared edge and the second panel comprises a chamfered edge.

22. The modular assembly as recited in claim 20, wherein the covering portion comprises two protruding portions that cover a gap formed between the adjacent edges of the first and second panels.

23. The connector bracket as recited in claim 22, wherein the protrusion extends from one of the one or more receiving portions.

24. The connector bracket as recited in claim 20, wherein the one or more receiving portions comprise opposing hook-like protrusions oriented at an angle of approximately 45° relative to the mounting plate.

25. The connector bracket as recited in claim 20, further comprising one or more angled plates that connect the one or more receiving portions to a mounting plate.

26. The connector bracket as recited in claim 20, further comprising a protrusion configured to engage a cutout in another connector bracket to facilitate alignment of the connector bracket with the another connector bracket.

27. The connector bracket as recited in claim 20, wherein:
the one or more receiving portions extend from a mounting plate; and
the mounting plate comprises one or more mounting features that facilitate the connection of the connector bracket to a panel or wall module.

28. The connector bracket as recited in claim 20, wherein the mounting plate comprises one or more clip portions that facilitate mounting of the connector bracket onto one or more rails.

* * * * *